(12) United States Patent
Hacker

(10) Patent No.: US 8,383,923 B2
(45) Date of Patent: Feb. 26, 2013

(54) SYSTEM AND METHOD FOR MUSICAL GAME PLAYING AND TRAINING

(76) Inventor: L. Leonard Hacker, Washington, DC (US)

(*) Notice: Subject to any disclaimer, the term of this patent is extended or adjusted under 35 U.S.C. 154(b) by 0 days.

(21) Appl. No.: 13/153,161

(22) Filed: Jun. 3, 2011

(65) Prior Publication Data
US 2012/0304847 A1 Dec. 6, 2012

(51) Int. Cl.
*G09B 15/00* (2006.01)
(52) U.S. Cl. .................................... 84/470 R
(58) Field of Classification Search .............. 84/470 R
See application file for complete search history.

(56) References Cited

U.S. PATENT DOCUMENTS 6,727,417 B2 * 4/2004 Oren-Chazon ............ 84/470 R

* cited by examiner

*Primary Examiner* — Jianchun Qin
(74) *Attorney, Agent, or Firm* — The Marbury Law Group, PLLC

(57) ABSTRACT

A system and method for musical training allows users to visually and aurally associate musical notes. The system allows user input to designate musical notes and instruments on which those notes are to be played. Users can spell words and phrases using the letter designations of the musical scale. The note associated with the letter designation of the musical scale is played back to the user on demand. Words and phrases are spelled with the letter designations can also be played back as musical notes associated with the letters used. The system can generate musical notes in a variety of musical instruments.

18 Claims, 7 Drawing Sheets

SYSTEM AND METHOD FOR MUSICAL GAME PLAYING AND TRAINING

The present invention relates generally to a system and method for training a user to understand music, musical notation, and ear training. More particularly, the present invention is directed to a system and method that can allow a user to select an instrument from a number of different instruments and output a location of a key along with a musical note for learning.

BACKGROUND

It is well-established that engaging a child at a young age is the best way to learn or train in music, foreign languages, and other topics. In addition, users of other ages can benefit educationally and in a cognitive fashion from training in subject matter with which they might not be familiar.

Musical training is one such endeavor that, if accomplished at an early age, can lead to great proficiency in later years. In addition, musical training in later years can ward off certain forms of cognitive dysfunction and may stimulate and gratify the student. Embodiments described herein provide systems and methods for accomplishing musical training regardless of the age of the user.

SUMMARY

Embodiments described herein present a flexible method of teaching music to users.

An embodiment allows for the visual display of musical notes in various forms.

Another embodiment allows a user to spell certain words using the letters of the musical notes (i.e., the A, B, C, D, E, F, and G of the C major scale C-D-E-F-G-A-B).

Still another embodiment allows for musical notes to be played back to a user when the user selects the letter designation for the musical note on a display screen.

In yet another embodiment words that are spelled using the letter designation for musical notes are played back to the user so that each word or series of words is represented by musical tones.

In yet another embodiment, the user may select a musical instrument which can then play back musical notes or series of notes designated by the user in an instrument of choice. In another embodiment, the instruments may be selected from a number of different instruments, or alternatively from a number of sound making devices that are not instruments designated by the user. In a further embodiment, the number of tones may be recorded and saved for playback later.

In yet another embodiment, the words that are created by a user using the letter designations of the musical notes may be words in a language other than English.

In a further embodiment the shape that represents the letter designation of a musical note may be in the form of a block or in the form of some other three-dimensional object that may not be representational of an object capable of producing a musical tone, or may be in the shape of an instrument that is normally associated with production of a musical tone (e.g. piano, violin, horn etc.).

In another embodiment, a user can select specific instruments (e.g. piano, violin, etc.) to spell out a word using the letters of the musical scale and the note placement of those letters on the specific instrument of choice.

In still another embodiment, all musical notes selected can be shown on a display in their appropriate location on a musical staff so that sounds can be associated with written music.

In another embodiment, ear training is taught via playback of musical notes and intervals.

In another embodiment the musical notes may be generated as sounds played by a variety of musical instruments or other objects capable of producing a musical tone, each of which creates a form of musical note such as but without limitation door bell, chimes, car horn, cell phone ring, phone ring, or any future musical note creating object. In this embodiment, an associated musical object can play the musical note or series of notes associated with a word. For example, a car horn may play the musical notes representing a "CAB."

In general, the system of the various embodiments illustrated herein comprises a music education processor having a graphics generator to represent musical notes in letter and in three-dimensional form. These three-dimensional representations of notes associated with the music education processor may take a variety of forms. For purposes of this application, these various three-dimensional forms will be referred to as "blocks." This is not meant as a limitation however. Any three-dimensional shape may be used so long as it provides a surface location which may be designated or "clicked on" by a user to trigger the processor to provide additional output to the user based upon the surface location that is designated. For example and without limitation, the three dimensional form may be the shape of a musical instrument itself on which a note is played.

The user interacts with the music education processor via various input means such as a mouse, a trackball, a touchscreen, a keyboard input, an electronic pen, voice commands, and other means used to interact with a processor, such as the Kinect™ controller for Xbox 360® from Microsoft®.

The music education processor provides the visual output to a display and audio output regarding the playing of musical notes so that the user can hear notes that are selected or other playback as described below, such as identifying letter names and sounding out words. For example, a video may be displayed that identifies the letter names and sounding out of words.

In general, the user interacts with a block relating to any particular musical note. Eight blocks are displayed to the user, each block representing a musical note the Western scale of musical notes (A, B, C, D, E, F, and G). The user can designate a particular note by pointing to it. In the simplest form, the musical note is played for the user when it is designated. In an embodiment, the musical note can be, for example, played on a piano. The piano playback is designated by the user by clicking on that particular instrument as represented on the surface of the block. However this is not meant as a limitation.

The user can select the musical instrument with which to playback a musical note by designating that particular instrument as represented on the surface of the block. For example, a user can drag and drop a particular instrument to a surface of a displayed musical block. Thereafter, all notes are sounded for the user as if they are played by the musical instrument selected and dropped to that block surface. Thus, the user can designate that all playback of musical notes be in an instrument of choice.

The user can also cause the shape to rotate to reveal other surfaces that can be actuated for other purpose. For example, rotation of the block can reveal other instruments to select that may be of interest to the user. Clicking on the letter associated with the particular block would then result in any instrument noted on that block playing the note associated with that block. This will provide the user with a variety of sounds, each of which will be associated with a particular musical note such as that heard in an orchestra from a particular instrument.

In addition to the playback of any particular musical note or series of notes, the embodiments illustrated herein can aurally recite the letter that is being clicked on as a further aid to, for example, young children, who are just beginning to learn to read. In this case, when the musical letter is selected, touched (in the case of a touch screen) or clicked on, the various embodiments will audibly pronounce the letter "B" for the user to hear. For example, the block may output audio of a spoken word and then output the audio of each letter for the user to appreciate the content for educational purposes. Thus an embodiment can be used by those who are also visually impaired. When the block is clicked on again at a particular location, it will show a piano keyboard (if the piano instrument is chosen) and the physical key representing the location of the "B" on the piano keyboard. Similarly if another instrument is clicked on, the location of the musical note "B" on that instrument will also be shown. The notes can also be indicated in a color to further enhance the ability to differentiate the position of one note on an instrument from another.

The location of these notes on the instrument of choice can be emphasized in a variety of ways. For example, a physical location can be somewhat larger than the surrounding notes for positions, the physical location may have a different color, the physical location can be made "active" meaning that it flashes or is surrounded by a moving border, or other means known in the art for designating a physical space. A further enhancement to the designation of the physical location can be an animation showing a finger touching a key, string, valve, etc. and playing with a note that is selected. In some instances, such as with a trumpet or saxophone, multiple fingers may need to be shown. In other instances, such as with a guitar, chords may be illustrated instead of individual notes. All of these explanations above are not meant to be limiting and are exemplary in nature.

The user can also make up words or series of words from the notes depicted on the blocks, and they will be saved. If the user makes up a word, that word can be looked up and, if it is a word, the word can be spoken by the music education processor. An indication may be given to the user that the made up word is actually a word. In this fashion, the system of the various embodiments illustrated herein, also teach reading and music at the same time. As an example, a partial list of words, names and abbreviations or acronyms is illustrated in Table 1 (Below).

TABLE 1

A
AA
AAH
AB
ABA
ABAC
ABACA
ABB
ABBA
ABBE
ABC
ABE
ABED
AC
ACAD
ACE
ACCA
ACCAD
ACCEDE
ACE

TABLE 1-continued

ACEA
ACEAE
ACED
AD
ADA
ADAD
ADAGE
ADC
ADD
ADDED
AE
AEAEA
AFF
AG
AGA
AGADA
AGAG
AGBA
AGE
AGED
AGEE
AGGADA
B
BA
BAA
BAAED
BABA
BABE
BAC
BACCA
BACE
BACCAE
BAD
BADB
BADE
BADEGG
BADGE
BADGED
BAEDA
BAFF
BAFFED
BAG
BAGDAD
BAGGAGE
BAGGED
BB
BBB
BE
BEE
BCD
BD
BDE
BE
BEA
BEAD
BEADED
BEBE
BED
BEDA
BEDAD
BEDDED
BEDE
BEDEAD
BEDEAF
BEE
BEEBE
BEEBEE
BEEF
BEEFED
BEF
BEFOG
BEG
BEGGED
BF
BG
C
CA
CAB
CABA
CABBAGE

TABLE 1-continued

CABBAGED
CABBED
CACA
CAD
CADE
CADGE
CADGED
CAE
CAECA
CAFE
CAFF
CAFFE
CAGE
CAGED
CBC
CBD
CC
CCC
CCD
CD
CEA
CECA
CEDE
CEDED
CEE
CEEB
CF
CFD
CFG
D
DA
DAB
DABB
DABBED
DACCA
DACE
DAD
DADA
DADE
DAE
DAFF
DAFFED
DAG
DAGDA
DAGGA
DB
DBA
DC
DD
DE
DEAD
DEAF
DEB
DEBAG
DEBAGGED
DEBE
DEC
DECA
DECADE
DECCA
DEED
DECE
DEE
DEED
DEEDBE
DEF
DEFACE
DEG
DEGAGE
DG
E
EA
EAD
EBB
EBBA
EBBED
ECAD
ECCE
ED
EDA

TABLE 1-continued

EDDA
EDGE
EDGED
EE
EECH
EF
EFF
EFFACE
EG
EGAD
EGG
EGGED
F
FA
FAA
FAB
FABACEAE
FABADA
FAC
FACADE
FACE
FACED
FAD
FADE
FADED
FADGE
FAFF
FAG
FAGACEAE
FC
FCC
FDA
FE
FEB
FEE
FED
FEE
FEEB
FEED
FEED-BAG
FF
FFA
G
GA
GAB
GABA
GABBED
GABE
GAD
GADA
GADBEE
GADDED
GADE
GAE
GAEA
GAED
GAGEA
GAFF
GAG
GAGA
GAGE
GAGGED
GCA
GD
GOE
GE
GED
GEE
GEED

Whenever the physical location for the note of choice is designated, it will be accompanied by the appropriate musical sound for the note designated. For example, if the piano is the instrument of choice, then the note will be sounded as if played on a piano. If the note is to be played on a saxophone, the sound of the note played on a saxophone will be heard.

Once the musical education processor designates the note being played, the user can repeat the process by clicking on the physical representation of, for example, the piano keyboard, and the note will be played for the user by such designation. In this fashion, all notes of the scale can be played, letter designations shown, instruments of choice selected, and user interaction can be achieved. In addition a designation of "higher" or "lower" can be pressed and the notes played will be in sharp or flat and the appropriate sharp or flat sign shall be displayed.

When a note is selected to be played, the note can be played as if sounded by the chosen instrument, such as a piano. On other parts of the block, there may be other instruments displayed. Selecting a note and an instrument will result in the sound being played on the desired instrument. Optionally, the user can elect to display or print the notes or music onto hard copy. Notes for all musical instruments can be saved as prerecorded sounds in a lookup table. Alternatively the notes may be synthesized and played back to the user when the user selects a specific note and specific instrument desired. There have been many advances in synthesized sounds so that software can be saved that generates the sound as selected by the user. Rather than storing separate sounds, the user hears the piano sound, for example, when it is synthesized by the software associated with the musical education system. In one embodiment, the apparatus may be used together with a printed instruction. For example, the user can review sheet music and play the desired notes using the input device.

An added feature to the embodiments described herein is the ability to spell words using the letters of the musical scale. In this case, the letters of the musical scale are displayed to the user and the user can spell words using the eight letters of the musical scale. For example, one can spell close to 250 words or names using the letters of the musical scale. These words can be played back to the user as a series of musical notes representing the word that is spelled. The words that are spelled can then be stored and served as a memory aid to the user. In addition, a display of the musical instrument of choice can be rendered by the musical education processor so that the user can see the word being spelled and, at the same time, see the locations on the instrument where those notes will be played. The locations of the notes can be shown by highlighting, active graphical designation, or an animation of a finger pressing the particular location on the instrument. These are meant as examples only and are not meant to be limiting. Many other words than shown may be used in connection with the present disclosure and the listing form no limitations to the present disclosure. In this fashion the letters can and be made into a song such as "BAD DAD GAB" that the child can then see written and played on the piano.

Thus, the user can see the word played on a piano or any other instrument desired. User can also look at another surface of the block, designate another instrument, and see what the sound will be like when played by another instrument. The user can play the sound or play the sounds representing the word of interest.

This process can also be done with words in Spanish, German, French and other languages that contain the 8 letters and words spelled by both letters in the foreign language selected.

In yet another embodiment, sheet music illustrating the particular key may also be displayed. For example, sheet music is a printed form of music notation that uses modern musical symbols. For example, the user may select a word, ACE. The apparatus may display each letter and the corresponding musical note in the predetermined instrument and may also show how or a manner of holding the instrument to play each key. In addition, the apparatus also may provide a representation of a sheet and notes on the sheet corresponding to ACE. The graphical display may use a five-line staff where pitch is shown by placement of notes on the staff sometimes modified by accidentals, and duration is shown with different note values and additional symbols such as dots and ties. Notation is read from left to right.

In another embodiment, a computer game operable on a processor having processor executable instructions is stored on a storage medium and includes program instructions to select an instrument. The computer game also has program instructions to formulate a word by entering at least two letters and program instructions to verify the word. The computer game also may include program instructions to generate audio correlating to each key associated with each letter using the selected instrument and program instructions to output the sound.

In yet another embodiment, a music block computer musical game and education system comprises an input device to select an instrument and to formulate a word by entering at least two letters. The game also may include a processor to receive inputs from the input device and to access a storage medium to verify the word. The processor generates audio correlating to each key associated with each letter using the selected instrument. The game also has a speaker that outputs the sound.

In another aspect, an apparatus has a computer device comprising a processor, an input device, and a memory. The processor executes processor executable instructions. The apparatus has a display and an audio output device. The apparatus may output at least two of a word's audio sound, an audio sound of each letter forming the word, a graphical image of the word, and a graphical image of each letter forming the word.

In the manner explained above generally, musical training and experimentation can be afforded a user regardless of age or experience of the user.

BRIEF DESCRIPTIONS OF THE DRAWINGS

DETAILED DESCRIPTION

Figure 1:
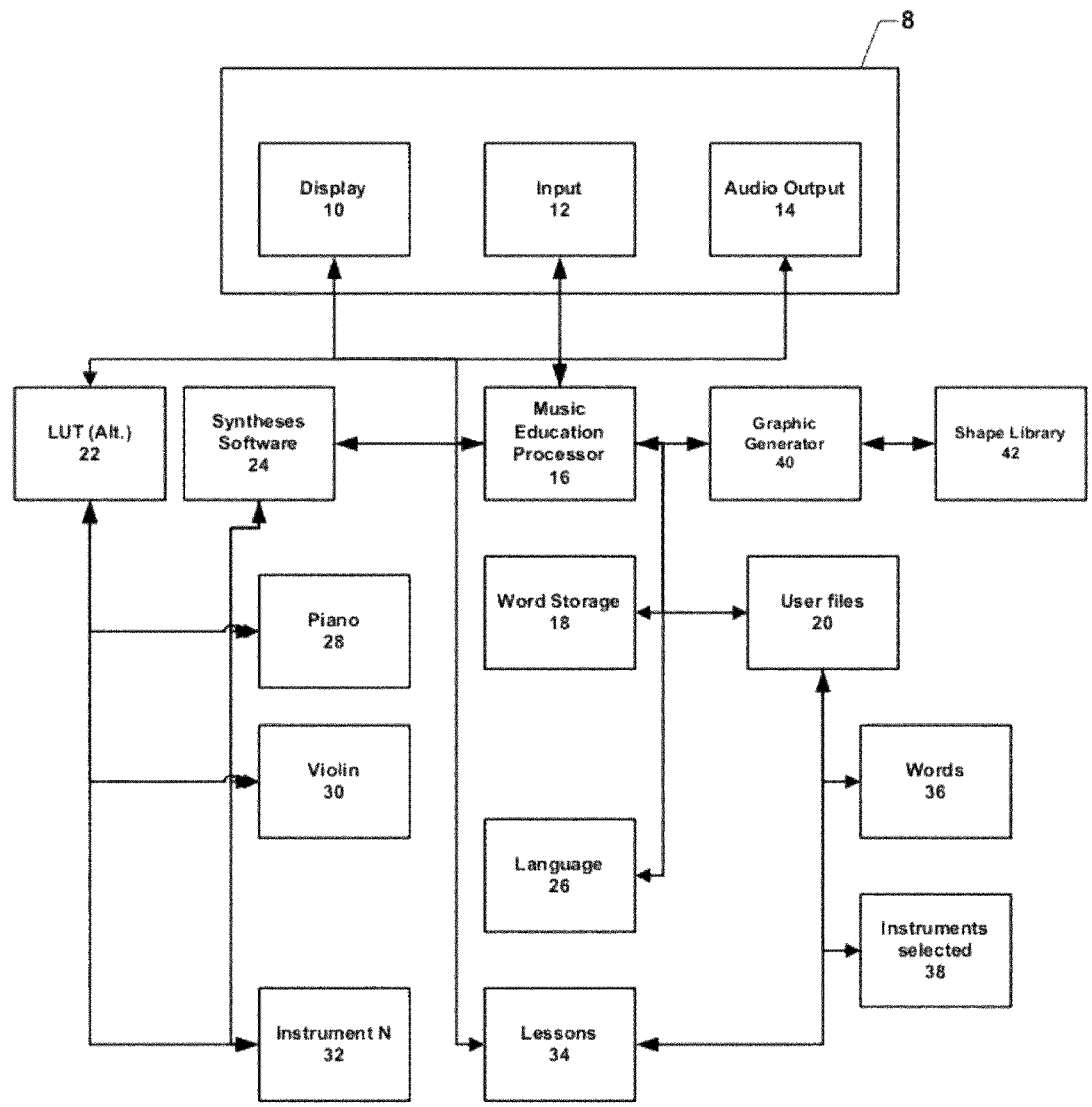
FIG. 1 illustrates an embodiment of a system of musical education.

In the detailed description that follows, the term musical "note" and "tone" are used interchangeably. Further, as explained below the term "block" and "three-dimensional shape" are also used interchangeably and are not meant to be limited to any specific abstract or real object. Indeed, certain three-dimensional shapes may simply represent a geometric shape without reference to a musical instrument while other three-dimensional shapes are representative of the instrument or tone generation object desired by a specific user. Tone and pitch are auditory perceptual properties that allow the ordering of sounds on a frequency-related scale. Pitches are compared as "higher" and "lower" in the sense associated with musical melodies, which are coherent successions of pitches. Pitch is a major auditory attribute of musical tones, along with duration, loudness, and timbre. Pitch may be quantified as a frequency, but pitch is not a purely objective physical property and is a subjective perceptible acoustical attribute of sound. A musical tone is a steady periodic sound. A musical tone is characterized by its duration, pitch, intensity (or loudness), and timbre (or quality). The notes used in music can be more complex than musical tones, as they may include aperiodic aspects, such as attack transients, vibrato, and envelope modulation.

A simple tone, or pure tone, has a sinusoidal waveform. A compound tone is any musical tone that is not sinusoidal, but is periodic, such that it can be described as a sum of simple tones with harmonically related frequencies. Generally, it may be difficult at first to determine and identify repeatedly certain musical tones. Only with repeated practice can a music student identify, recognize and reproduce certain tones. Generally, a music student would like to identify a musical tone using at least two different perceptible senses. For example, hearing and seeing the musical tone in a repeated manner may assist the student with learning. For example, seeing the musical tone in words, and hearing the specific musical tones in a key by key fashion using an instrument of the student's choice may assist the music student with learning and recognizing certain keys. Additionally, seeing and hearing tones associated with English or non-English words may also have value to the user since the user already knows these words and can make an association with the letters and tones. By hearing certain tones in succession with a commonly used word may allow a user to absorb and retain the educational subject matter.

For example, the present disclosure may include an apparatus that can allow the user to select an instrument. Then, the apparatus can display or output any one or more of (1) the hand's placement on the instrument to generate a predetermined key (for example, a finger on a piano key); (2) a musical tone of the predetermined key; and (3) an alphanumeric character representing the key; or (4) a sheet musical note of the key; or any other educational relevant parameter to teach the student. In another embodiment, video may be output for further training. In another embodiment, an audio instruction recording may be output.

Referring now to FIG. 1 an overall description of musical education is illustrated. A musical education processor 16 is connected over a network to a user device 8. User device 8 comprises input means 12, display 10, and audio output 14. Input means 12, may comprise keyboard, electronic pen, touch screen, keyboard, and microphone for voice commands to name but a few input methods. In another embodiment, the user device 8 may include a depth camera to detect gestures of the user to formulate input commands. These methods are not meant to be limiting.

Audio output 14 is used to receive the audio output from the musical education processor 16 in the form of musical notes being played. Display 10 is used to display three-dimensional blocks each of which comprises various designations and attributes associated with a musical note. Each block comprises various surface areas which are interactive and which, upon designation by a user using the input means 12 results in an action by the musical education processor 16.

Musical education processor 16 comprises instructions for interacting with the user device 8, and various other modules of the musical education system. For example, when the musical education processor 16 receives instructions from user input means 12 to play a particular musical note, musical education processor 16 signals the synthesis software 24 to generate the particular musical note designated by the user. Processor 16 may be a digital signal processor.

In general, a user will designate a particular musical instrument, or if a musical instrument is not designated a default instrument may be used, the musical education processor 16 will receive the signal for the note desired together with the instrument of choice. That instruction would be sent to the synthesis software 24 which would access the appropriate instructions for generating a musical note from, for example, a piano 28, a violin 30, or any other musical instrument 32. The synthesized musical note is then sent back to the musical education processor 16 for subsequent playback through the audio output 14 of user device 8. In another embodiment, the user may designate a non-musical instrument, such as, for example, a car horn, fog horn and the designated non-musical instrument may generate the sound or acoustic effect.

As an alternative to synthesizing each musical note, musical notes may be stored in a lookup table 22 which has libraries of pre-recorded musical notes for piano 28, violin 30, or any other musical instrument 32. The musical instruments noted herein are exemplary only and are not meant to be limiting. In another embodiment, the apparatus may further comprise a power source, such as, for example, a plug, a rechargeable nickel cadmium battery, a lithium ion battery, or a rechargeable solar cell.

If the user elects to spell words using musical notes, the user sends a signal to musical education processor 16 that this particular function is to be exercised. Thereafter, each time a user sends a signal via the user input 12 to the musical education processor 16, the musical education processor 16 interacts with a word storage module 18 comprising all the words and phrases that can be spelled with the musical notes of the scale. When a word is spelled, musical education processor 16 confirms that a word that is stored in the word storage module 18 has been spelled correctly and signals are sent to user device 8 to display the word on display 10 and provide audio signals to the audio output 14 on user device 8 so that the word that is spelled is also sounded out in musical tones. In this fashion a user not only spells a word or series of words but hears the musical tones associated with each letter to further reinforce the learning process.

As noted above, the musical education processor 16 can also search for words that are spelled using the eight notes of the musical scale in a foreign language. In this case, musical education processor 16 interacts with a foreign language module 26 to further search for words in word storage 18. Thus a user can send an instruction to musical education processor 16 to search for a word in, for example, French that is also spelled with the eight letters of the musical scale. Foreign language processor 26 would interact with word storage 18 to provide the appropriate foreign language word to musical processor 16 that will then be sent to user device 8.

The musical education system of the various embodiments illustrated herein also comprises user files 20 that list a progress of the user of the system. These user files 20 contain the various words that have been spelled by the user 36 together with the instrument selected by the user 38. In this fashion when a user signs on to the system, information from user files 20 can be retrieved and education of the user can pick up where it left off. The user files 20 may comprise a number of processor executable instructions.

Part of the overall musical education system is also a lesson module 34 that allows musical education processor 16 to guide a user through the musical education process via a series of graduate music lessons. Such lessons can be, without limitation, ear training, music theory and specific instructions regarding specific musical instruments. By providing a series of lessons 34 that are keyed to the age, education, and sophistication of the user, the musical education processor 16 can provide to the user device a series of lessons to assist in the education of the user. Thus, the user does not have to be self-directed or self-motivated, but rather can be assisted in the education process, regardless of age, by the musical education system is illustrated above. In this aspect, the graphic generator 40 and display 10 may output a short video program on the display 10. For example, the user may select an incorrect key or note or otherwise make an error. In response to the error, the user may watch a short video program on the display 10 that suggests corrective action and that provides instruction to correct the error. For example, the user may incorrectly note a key on a piano and then watch a short video that instructs the user of the correct key. In another embodiment, the audio output 14 may also output a short audio program for instruction purposes instead of, or in addition to, the video program.

The musical education system, in yet another embodiment, comprises a graphic generator 40. The graphic generator 40 creates a three-dimensional shape associated with a particular musical tone or a series of three-dimensional shapes associated with different musical tones and may present the same to the user interface 8 on the display 10. Graphic generator can access a shape library 42 having a series of geometric shapes as well as three-dimensional representations of musical instruments and objects. Shape library 42 may be stored on a storage medium and may comprise a number of process executable instructions. A musical object may be a bell, a representation of an automobile horn, fog horn, an imaginary instrument, or any other shape that can produce a musical tone. Each of these three-dimensional shapes comprises a series of active regions. Each region can be displayed to the user such that clicks on the region of the three-dimensional shape result in the selected musical tone is sounded on the audio output 14 of the user interface 8.

Figure 2:
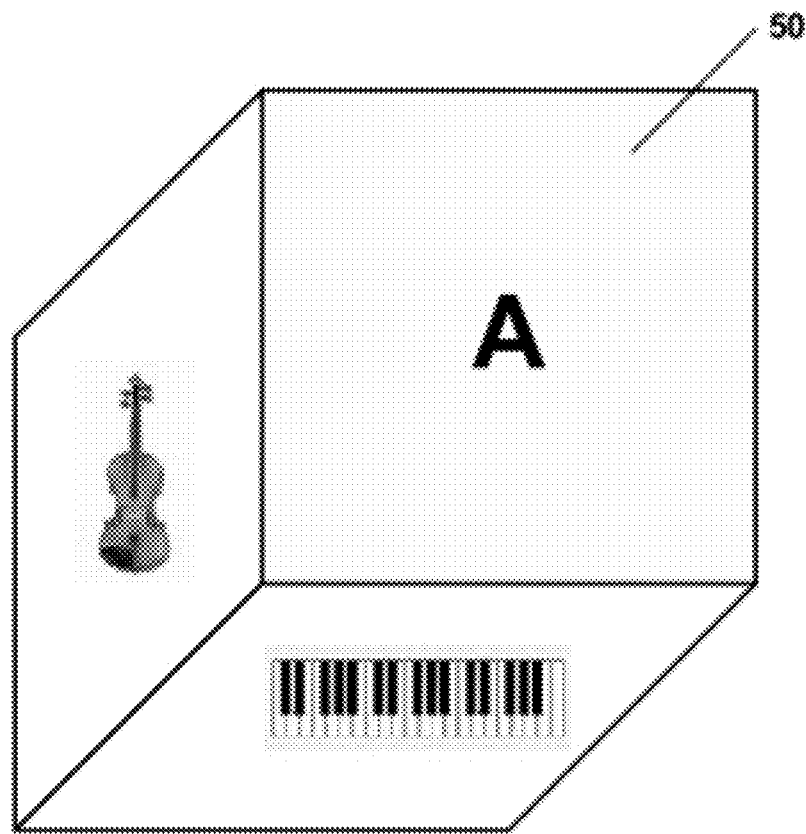
FIG. 2 illustrates a graphical representation of a block having musical notations and other features.

Referring now to FIG. 2 a musical "block" of an embodiment is illustrated. For example, two or more surfaces of the "block" may include a touch screen input device 12 as discussed in FIG. 1. In this case a block with the musical letter A is illustrated. This block would be displayed on user device 8 on display 10. When the user clicks on the surface of the block comprising the letter A 50, this signals to the musical education processor 16 that the user is interested in the musical note "A." The musical instruments noted on the block will also be in the same color or other graphical representations as the illustration of the letter "A" thereby providing yet another association between the letter and the physical location of the desired note. Thereafter, all sounds related to various selections by the user will have the tonal sound of the musical note A. If the user selects that note to be sounded as if played on a violin, the user will select the surface depicting the violin 52 and all sounds will be heard as if played on a violin. Alternatively, if the user selects the sound to be played on a piano, the user would select surface 54 depicting the piano and thereafter all sounds would be heard as if played on a piano.

As noted above it is not necessary that the musical block be in a cube form. Rather it can be in any shape so long as there is a space or surface (curved or flat) to designate a musical note and other instruments and features as noted above. The three dimensional shape can be a musical instrument, another geometric shape such as a pyramid, sphere, or any other shape providing surface area on which to designate the features of the various embodiments. Preferably, any three dimensional shape of a sufficient size having at least one planar surface can be used and is within the scope of the present disclosure. For example, the three dimensional shape may have one planar surface that is apportioned into multiple sections. Other surfaces may display functional icons as will be discussed.

Figure 3:
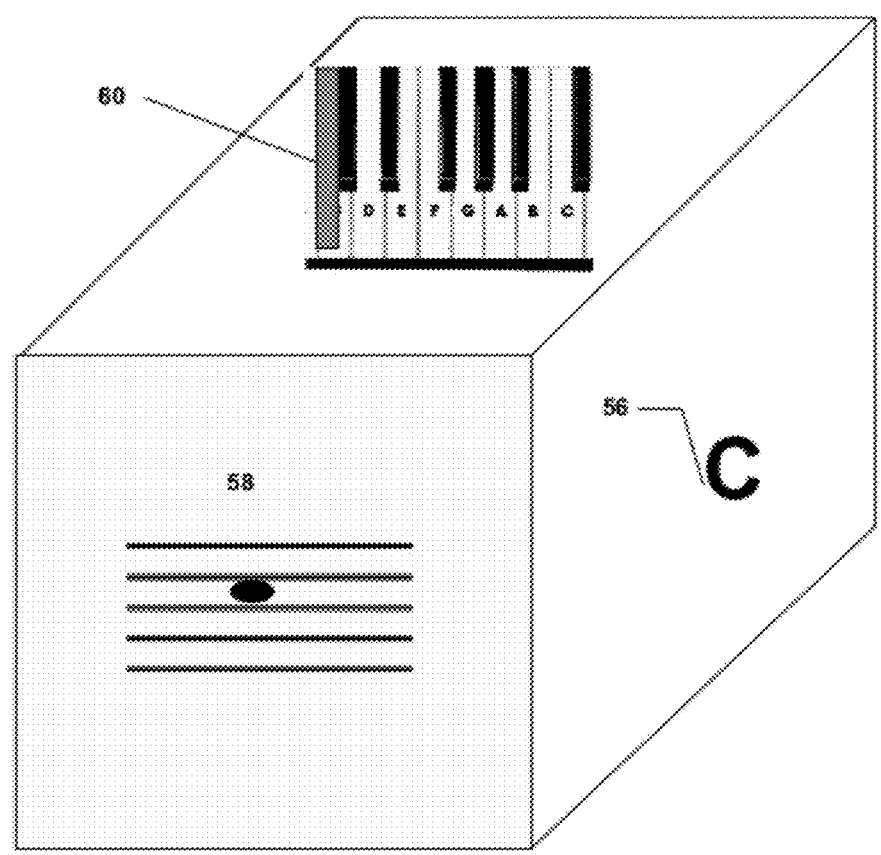
FIG. 3 illustrates a three dimensional representation of a shape that is associated with the musical tone "C."

Referring now to FIG. 3, a three-dimensional representation of a shape that is associated with the musical tone C is illustrated. This shape displayed to a user on the user interface 12. The user can click on the letter C 56 which will result in a signal being sent to the music education processor 16 in FIG. 1 to generate a musical tone associated with musical tone "C" with a musical tone being sent back to the user interface 12 having an audible musical note. For example, the user may click at least two times to appreciate the tone and learn the musical "C" tone. Simultaneously the note, in this case on the piano 60, can be highlighted (shown in crosshatching) in the location on which the note appears on a musical staff 58. For example, the user can appreciate a location where the musical note "C" can be found on the desired instrument and it should be appreciated that multiple different instruments may be illustrated to appreciate a location where the musical note "C" can be found, for example, a trumpet, a saxophone, a guitar, a violin, a harmonica, etc. The user may further toggle between different instruments to learn the placement or may display two or more instruments 60 as shown in FIG. 3 to learn differences. The user may also render an input on the icon 60 to hear the musical note "C" using a first instrument and may also render an input on the icon 58 to hear the musical note on a different instrument. As a further enhancement, all three representations of the note "C" 56, 58, and 60 can be depicted in the same color so that the user can see the association of the note, and physical location, and a letter designation simultaneously.

For example, in another embodiment the order may be opposite, the user may depress letters on the piano keys icon 60 and spell words and the apparatus may correlate the depressed words on the keys 60 with letters 56 and/or with keys on a different instrument as shown by icon 58. For example, the user may depress icon 60 and spell a word using the piano keys "A" then "C" then "E". The apparatus may speak the word "ACE" then the letters "A", "C", "E". In another embodiment, an entire song may be played, and the icon 60 or 58 may display each key as the key is played and entered on the piano key icon 60 or on the string icon 58. For example, the piano key input may be "D", "A", "D", "B", "E", "E", and "F". The user may control the apparatus to save the keys and now play the song. The apparatus may play the song with the chords in succession with a letter for each chord being displayed in succession so the user can appreciate the correlation. In another embodiment, the apparatus may be used as a game where certain letters are missing from a word and the user may input the missing letters using the piano icon or strings by playing the "missing" musical note for educational purposes. For example, the word "D_D" may be displayed. The user to solve the puzzle may render an input on the "A" piano key. Various configurations are possible and within the scope of the present disclosure.

Figure 4:
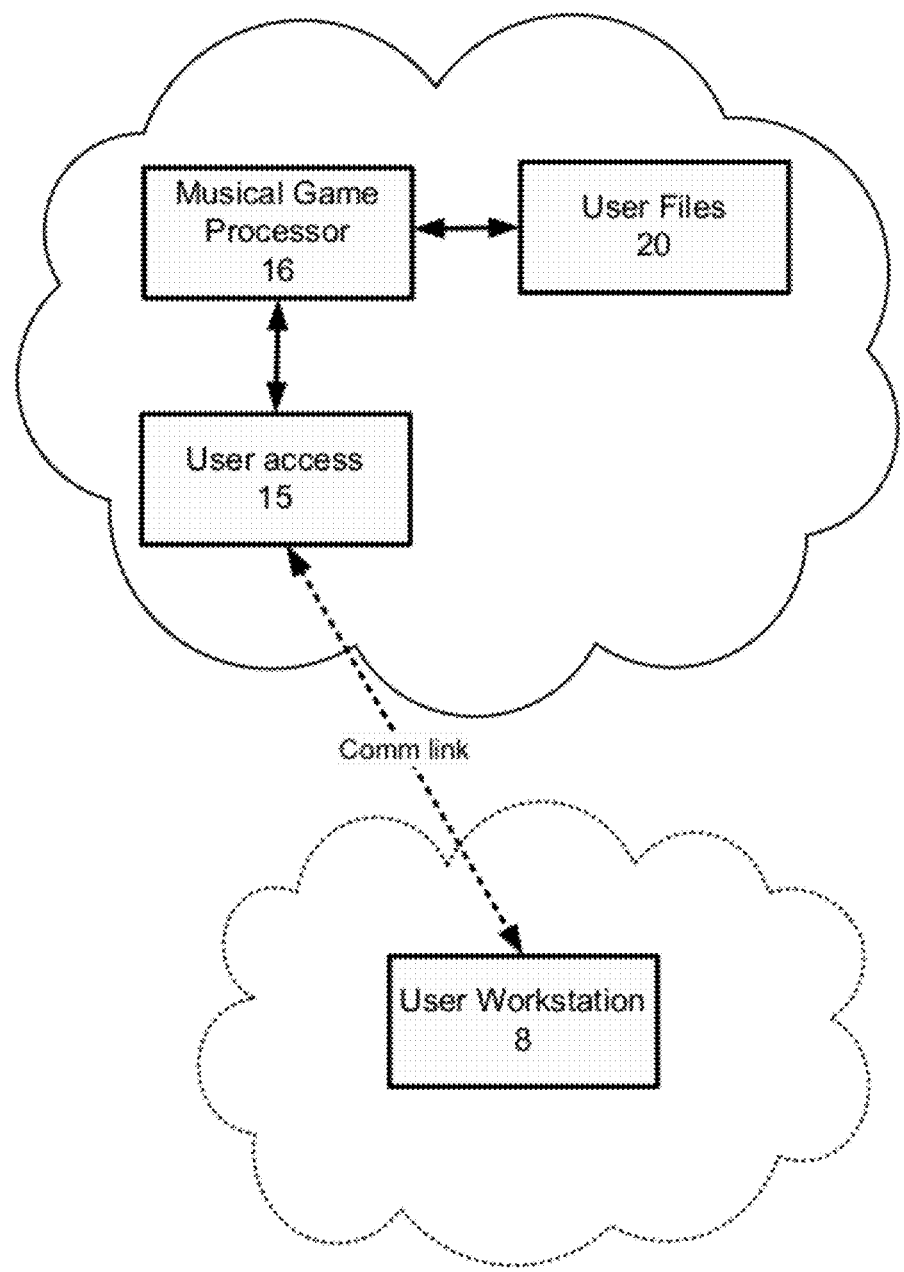
FIG. 4 illustrates a networked embodiment of the system of a musical education.

While the musical education system has been illustrated above, those skilled in the art will understand that this process can take place on the single computer, over an intranet, or over the Internet when served from the server as illustrated in FIG. 4. For example, the processor 16 may access a remote network storage medium using a wireless transceiver device so the apparatus remains lightweight. For example, the processor 16 may control a transmitter/receiver or transceiver to receive data corresponding to different sounds and different instruments and other graphical and video data to assist with musical training and musical learning. In one embodiment, the apparatus may receive/transmit data from a cloud computer configuration.

FIG. 4 shows a user workstation 8 and a user access device 15. The user access device 15 is connected to a musical game processor 16 and that is also connected to program executable files 20. A communication link is established between the user access block 15 and the user workstation 8. Preferably, the apparatus 8 may be very lightweight and may include only essential components or a reduced number of components for a light weight device. In this aspect, the apparatus 8 may access a storage medium 20 that is located a distance away from the apparatus 8 and may download essential files in order to display education materials as discussed herein. Apparatus user workstation 8 may be separate from the network on which the musical game processor 16 exists and processor intensive tasks may be rendered and then provided to the apparatus 8 for display. Thus, the workstation 8 may include a lightweight configuration and does not need a large storage medium to store numerous video and audio files and instead a user may access files using block 15 and using a communications link. Once the user access function 15 delegates the user workstation 8, then the musical game processor 16 may access any associated user files 20. In this manner, the user can then utilize the musical game system or the user may utilize any network. This illustration is not meant to limit the number of user workstations 8 that may be connected to a network or to the musical game processor 16. For example, two or more user workstation apparatuses 8 may be connected to the user access block 15 via the communication link. Those of skill in the art will understand and will appreciate that multiple user workstations can be connected to the musical game processor 16 over, for example the Internet, or some other gaming network to allow multiple users to utilize the musical game system at the same time. For example, two user work station apparatuses 8 may interact, collaborate and/or compete with one another to determine who is learning faster and has more accurate responses, etc. Additionally, at least two user work station apparatuses 8 may include a microphone and speakers to speak with one another and discuss the musical learning over a communication link.

Figure 5:
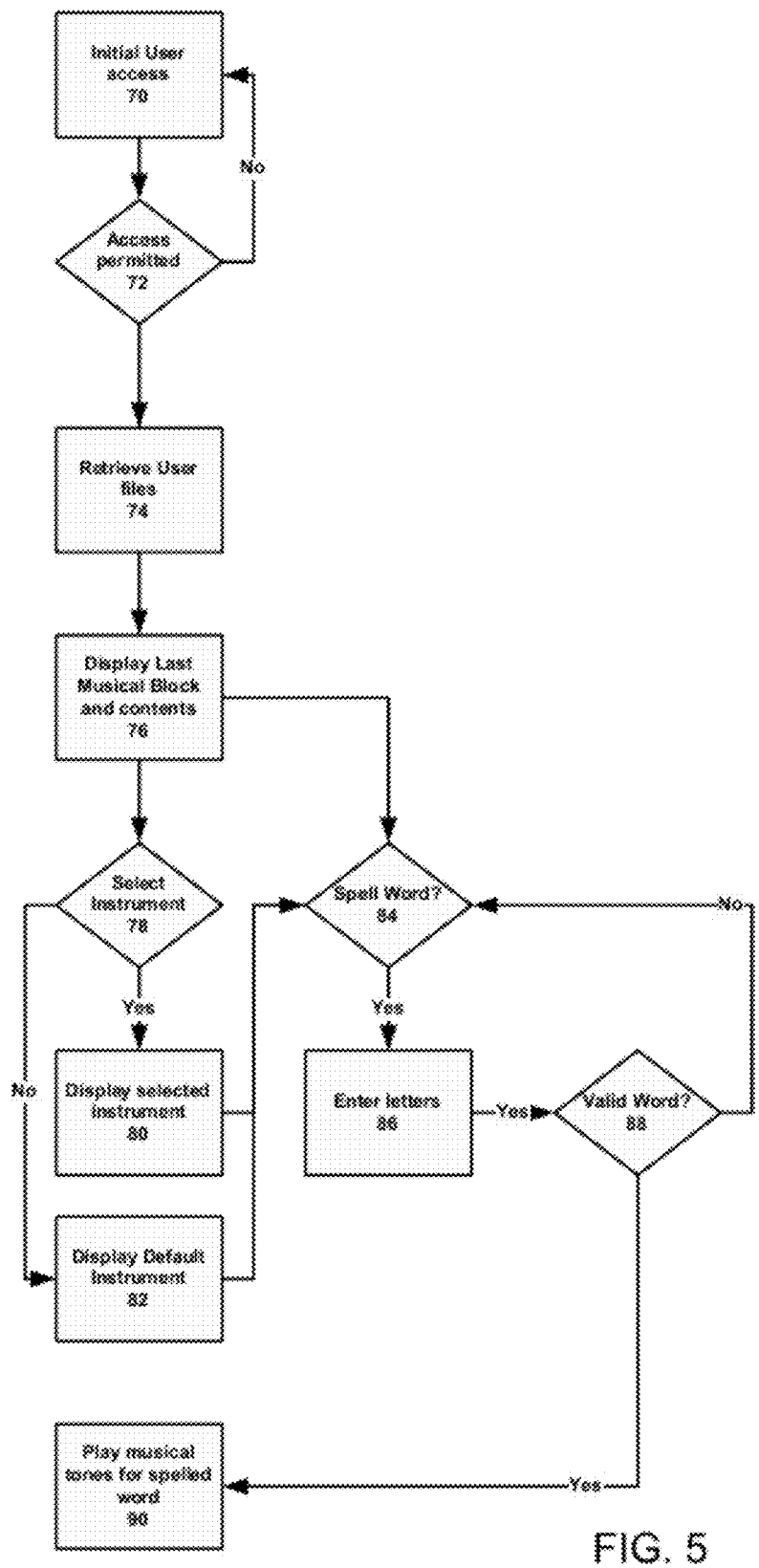
FIG. 5 illustrates a word spelling option embodiment of a musical education system.

Referring now to FIG. 5, the word spelling capability associated with the musical game system is illustrated. FIG. 5 may be implemented in a computing device having a processor configured with processor-executable instructions to perform the operations of the method. In method, the processor may commence operation and the user may initially access the musical game system 70 when that system is either resident on an individual processor or over a network. The system will check to determine if access by the user is permitted 72 for example, using a password, and a user name. If not, the user is returned to the initial user access functionality 70. If access is permitted 72 the system will retrieve any user files 74. This will cause the last musical block display and the contents of the musical block to be displayed for the user 76.

The user then has several options. The user can select a musical instrument 78 that will be used by the musical game system to create the sounds to be heard by the user for other activities. If the user elects to select any musical instrument 78, a number of musical instruments are displayed for the user 84 to select. For example, icons pertaining to a piano, drum, harmonica, saxophone, violin, guitar, or any string instrument may be displayed and the user may select the particular instrument using an input device. The user then selects that instrument which is then displayed on the musical block for subsequent use.

The user also has the option to utilize the contents of the musical block when the user last utilizes the system 76 for subsequent input to the word spelling function 84 of the musical game system. If the user does not designate a musical instrument 78 the system will either display the last musical instrument used or display a default instrument such as for example a piano 82 for subsequent use.

The user is then asked if the user is to spell a word 84. If the user desires to spell a word the user is then asked to enter letters 86 for the board. This is done either using a normal computer input means and using the eight letters of the musical alphabet, or the letters are selected from the appropriate note location on the musical instrument, for example the notes of a piano, or the fret location of notes for stringed instruments. These are exemplary means only and are not meant as limiting. In another embodiment, the method may utilize voice recognition to capture the word/letter/keys. The letters that are entered are then checked against a word database 88 to determine if the word being spelled is a valid word. If the word is not the valid word, the user is returned to the word spelling input function 84.

If the word that is spelled is a valid word 88, the musical notes associated with the valid spelled word are then played for the user 90. In this fashion, a user can associate musical tones with words to further enhance the learning experience.

Figure 6:
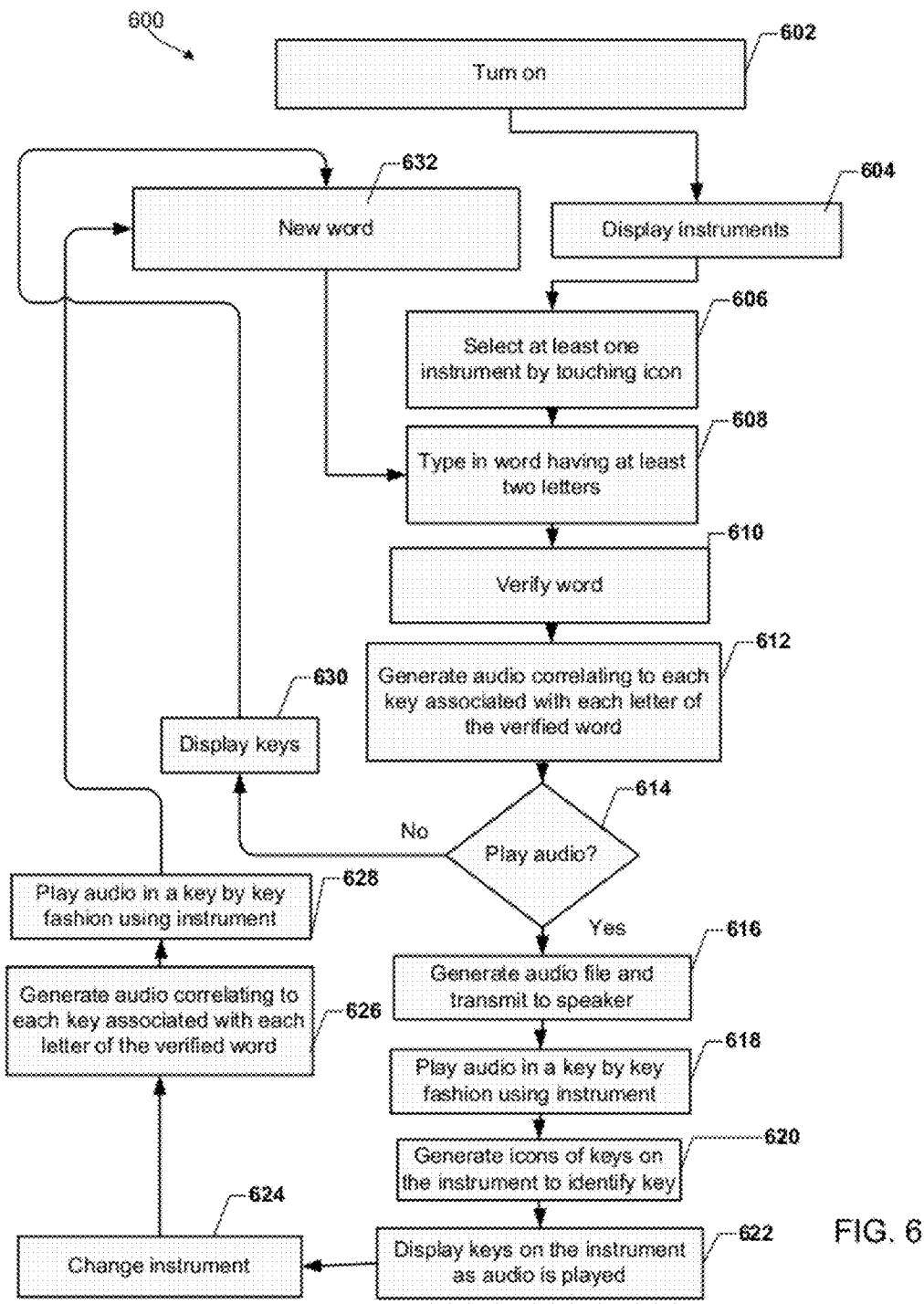
FIG. 6 illustrates an embodiment method of musical education.

FIG. 6 shows an embodiment method 600 for playing a computer game and for learning musical notes for a number of different instruments by using ordinary words to learn musical keys and the location of the musical keys. The embodiment method 600 may be implemented in a computing device having a processor configured with processor-executable instructions to perform the operations of the method. In method 600, the processor may commence operation by turning on in block 602.

In block 604, the method 600 may display instruments. For example, the instruments may be displayed on a display screen associated with a housing, for example, a musical block. A flute, piano, guitar, violin, trombone, string instrument, trumpet, etc. may be displayed on a touch screen display in an arrangement in a graphical user interface. In block 606, the user may select at least one instrument from the assortment displayed on the touch screen display by rendering a touch screen input over the icon and pressing the icon until a confirmation is received that the user selected at least one of the instruments. In another embodiment, two instruments may be selected to play in unison.

For example, the user may touch over the guitar icon and select the guitar for hearing the keys in the guitar's chords. In block 608, the user may engage a keyboard, (or piano keys) or render inputs in cursive text on the touch screen to spell at least one word on the touch screen. For example, the user may type in "ACE" in the key pad and the letters may be displayed in the touch screen. In block 610, the processor may receive the inputs and verify the word using a dictionary stored in memory. The processor will compare the word to a plurality of words stored in memory. If a match is made, the processor may process the word and in block 612, the processor may generate audio correlating to each key "A", "C", and "E" in the selected instrument of the verified word.

If a match is not made, then the embodiment method 600 may await a new word or may provide an indication. In decision block 614, the processor may receive an input to determine to play the audio or may automatically play the audio based on a user's preferences. If so, (i.e., decision block 614="YES"), which indicates that the user would like to play the audio; the processor 16 may generate an audio file and transmit the audio file to an audio output or speaker 14. For example, several different audio files may have to be generated depending on the instrument or playing icon (car horn etc.) selected by the user. In block 618, the processor 16 may play the word in an audio format in a key by key basis using the selected instrument.

For example, the guitar may play "A" for a duration, then note "C" for a duration and then note "E" for a duration so the user may appreciate the correlation between the sound and the keys of the word. In another embodiment, the guitar may play the keys faster and output a song. In block 620, optionally, the processor may further generate icons of the keys in a graphical format when the key is being sounded out so the user may further appreciate the audio. In block 622, the processor, optionally, may further graphically illustrate which strings and frets on the guitar are being played as the audio is being output. For example, a first string and fret illustrating "A" for a duration and with a highlighted feature or arrow pointing to the string and fret, then a second string and second fret illustrating "C" for a duration and with an arrow pointing to the second string and second fret and then a third string and fret illustrating "E" for a duration with an arrow pointing to the third string and third fret. In another example, in FIG. 3, the keys A, C, and E may be highlighted or may be pointed to with an arrow.

In block 624, the processor 16 may further change an instrument for contrast purposes and for further learning purposes. For example, the user may select secondly a saxophone. In block 626, the processor may generate the audio associated with the second instrument for each key of the verified word. In block 628, the processor may control the speaker to output the audio for the newly selected instrument in a key by key fashion. For example, the sax may sound in a key of "A", "C", and "E" notes, or in different notes. In block 632, a new word may be selected. On the other hand, if the audio is not selected to be played in block 614, which indicates that the user would not like to play the audio, the processor may display the keys and a placement on an instrument thereof in block 630. Optionally, the method 600 may further include a short video or audio file including instructions on the instruments and the keys and how the musical instrument is operated. For example, a user may be asked to confirm that the sounds are A, C, and E and a video may provide a graphical encouragement to the student user. In block 632, a new word may be selected.

In yet another embodiment, the instrument may be selected from a piano, a violin, a voice avatar, a guitar, a wind instrument, a harp, and hypothetical instruments, such as, for example, a car horn, a door bell, telephone ring, a battleship horn, Morse code, rain drops, etc. For example, in one embodiment, the system may comprise an avatar icon, cartoon, or mouth icon that would sing the musical notes in the particular key. In another embodiment, the apparatus may save notes for playback later on. For example, the user may enter a word "ACE" and hit save. Then, the user may play back the musical notes that formulate the word "ACE" by a single input command.

In another embodiment, the apparatus may save placement of the notes on the instrument for playback later on. For example, the user may enter a word "ACE BEEF" and hit save. Then, the user may play back the musical notes being instructed on the selected musical instrument (for example, an arrow on the piano on the A key, then the C key etc) that formulates the word "ACE BEEF" by a single input command.

In another embodiment, the apparatus may save placement of the musical notes for playback later on in a longer song. For example, the user may enter multiple words (for example, 15 words) and input "save". Then, the user may play back the musical notes all that form the 15 words at once in a song by a single input command and listen. In yet a further embodiment, the apparatus may be connectable to a media player to receive input of songs and the apparatus may provide an output of the musical notes that formulate the songs that are input.

Figure 7:
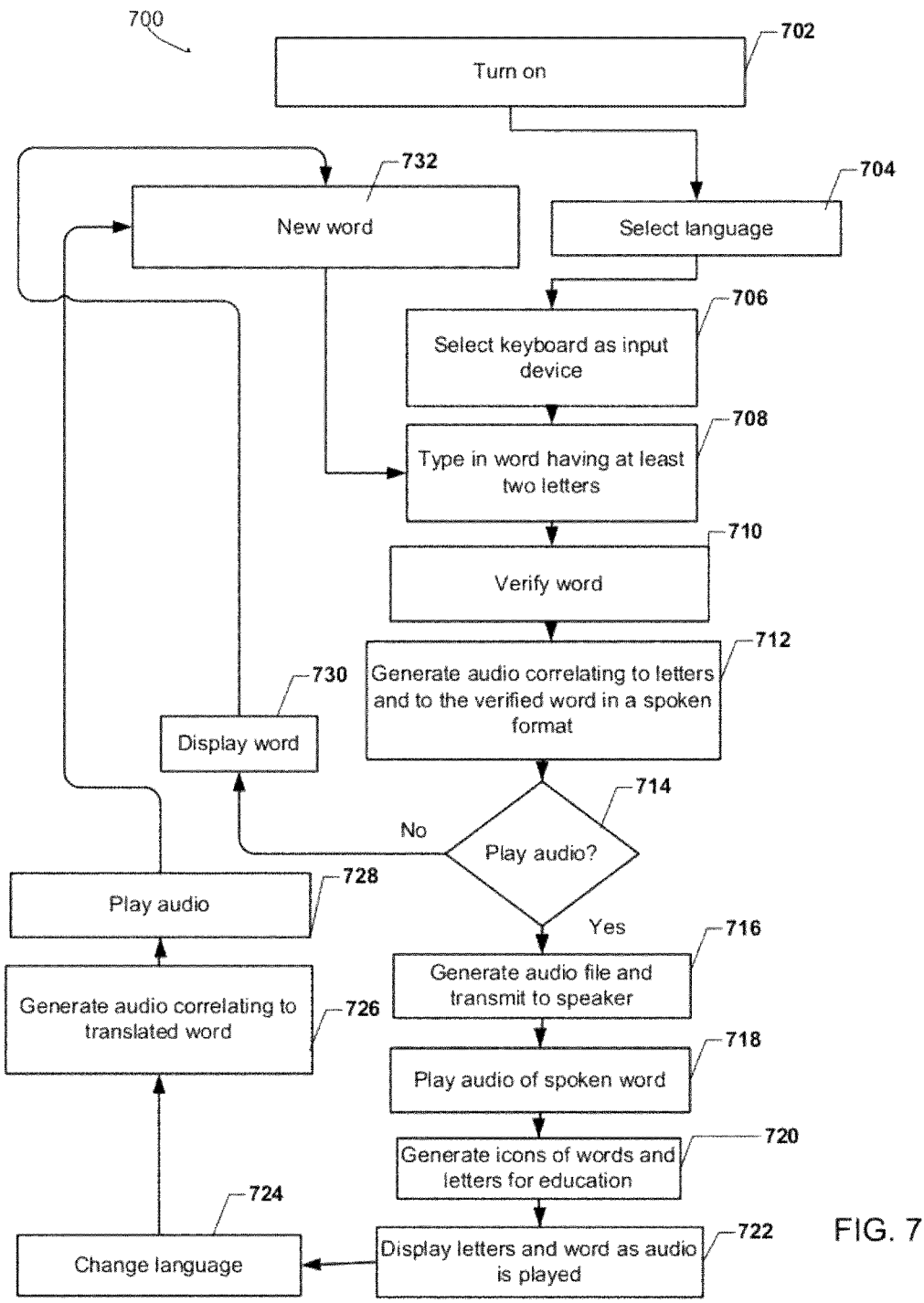
FIG. 7 illustrates another embodiment method of education to sound out words and letters.

FIG. 7 shows an embodiment method 700 for playing a computer game and for learning sounds of letters and words by using ordinary English or non-English words. Method 700 is useful to allow a user to learn the sounds of letters, the sounds of words and how to recognize letters and words. The embodiment method 700 may be implemented in a computing device having a processor 16 configured with processor-executable instructions to perform the operations of the method. In method 700, the processor may commence operation by turning on in block 702.

In block 704, the method 700 may display a number of different languages, for example, French, English, Spanish, German, Italian, Russian, Portuguese, or any other language known in the art for selection. The user may select "English" from a drop down table. In block 706, the user may select a keyboard or other input device as the input device. In one embodiment, the input device may be a touch screen device.

In block 708, the user may engage the keyboard, or render inputs in cursive text on the touch screen to spell at least one word on the touch screen. For example, the user may type in one English or non-English word in the key pad and the letters may be displayed in the touch screen. In block 710, the processor may receive the inputs and verify the word using a dictionary stored in memory. The processor will compare the word to a plurality of words stored in memory. If a match is made, the processor may process the word and in block 712, the processor may generate audio correlating to each letter in the verified word and then may speak the word itself.

If a match is not made, then the method may await a new word or may provide an indication. In decision block 714, the processor may receive an input to determine to play the audio or may automatically play the audio based on a user's preferences. If so, (i.e., decision block 714="YES"), which indicates that the user would like to play the audio, the processor may generate an audio file and transmit the audio file to a speaker in block 716. In block 718, the processor may play the word in an audio format in a letter by letter basis for learning. For example, the word may be "CAT". The method 700 may spell the word "C", "A", "T". Graphically, the word and letter may be displayed. The method 700 may then optionally formulate the sounds for each letter "C" then "A" and then "T" for a predetermined duration. The method 700 may optionally request that the user repeat the words. The method 700 may then speak the word "CAT". The processor may also speak the word in the native format and also may further translate the word. In an optional embodiment, the method 700 may further provide musical notes for a word, for example, a "C" note, and an "A" note and may omit non-musical letters. The notes can be made in a selected instrument that is desired by the user as discussed in FIG. 6. Various configurations are possible and the embodiment method 700 may be used to learn a new language and to also provide learning to non-English speakers.

In block 720, optionally, the processor may further generate icons of the words and/or keys in a graphical format when the word and/or key are sounded out so the user may further appreciate the audio. In block 722, the processor, optionally, may further graphically illustrate the letters as the audio is played. In block 724, the processor may further change a language from a current language to a new language. For example, from German to Spanish. In block 726, the processor may generate the audio associated with the new language of the word. In block 728, the processor may control the speaker to output the audio for the newly selected language and word in a key by key fashion. In block 732, a new word may be selected. On the other hand, if the audio is not selected to be played in block 714 that indicates that the user would not like to play the audio, the processor may display the word thereof in block 730. The method 700 may also include a short video or audio file including instructions to further assist with learning.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A musical game and education system comprising:
    a user interface comprising:
        a display;
        an input device; and
        an audio output device;
    a music education processor (MEP) connected to the user interface via a network;
    a graphic generator connected to the MEP, the graphic generator comprising instructions for generating three dimensional shapes on the display of the user interface, each three dimensional shape associated with a musical tone and including at least a first surface illustrating a musical letter and a second surface illustrating a musical instrument; and
    a device connected to the MEP, the device configured to generate the musical tone associated with the musical letter and the musical instrument illustrated on each three dimensional shape and output the musical tone associated with the musical letter and the musical instrument illustrated on each three dimensional shape to the MEP in response to a request from the MEP,
    wherein the MEP comprises instructions for:
        receiving a selection of a three dimensional shape displayed on the display of the user interface from the input device of the user interface;
        sending the request to the device to generate the musical tone associated with the selected three dimensional shape;
        receiving a generated musical tone associated with the selected three dimensional shape from the device; and outputting the generated musical tone associated with the selected three dimensional shape via the audio output device of the user interface.

2. The musical game and education system of claim 1, wherein the input device is selected from the group consisting of a touch screen, a mouse, a trackball, a keyboard, gesture commands, and voice commands.

3. The musical game and education system of claim 1, wherein the three dimensional shapes comprise shapes selected from the group consisting of spheres, pyramids, cubes, and cylinders.

4. The musical game and education system of claim 1, wherein the three dimensional shapes comprise musical instruments.

5. The musical game and education system of claim 1, wherein each three dimensional shape further includes a third surface illustrate an aspect of the musical tone associated with the three dimensional shape taken from the group consisting of a musical note associated with the musical letter as written on a staff and the physical location of the musical tone on a musical instrument.

6. The musical game and education system of claim 1, wherein the device comprises instructions for synthesizing the requested musical tone.

7. The musical game and education system of claim 6, wherein the instructions for synthesizing the requested musical tone comprises instructions for generating the requested musical tone from at least one of a plurality of musical instruments.

8. The musical game and education system of claim 1, wherein the device comprises instructions for extracting the requested musical tone from a look up table having pre-stored musical tones.

9. The musical game and education system of claim 8, wherein the instructions for extracting the requested musical tone from a look up table having pre-stored musical tones comprises instructions for extracting the requested musical tone for the musical instrument illustrated on the second surface of the selected three dimensional shape.

10. The musical game and education system of claim 1, further comprising a storage of words spelled using the tones of the musical scale.

11. The musical game and education system of claim 10, further comprising language translation instructions for translating the words of the word storage into foreign languages.

12. The musical game and education system of claim 1, further comprising a storage of user files for storage of a particular user's interaction with the education system.

13. The musical game and education system of claim 1, further comprising a musical lesson file comprising graduated music lessons for presentation over the user interface to a specific user.

14. A method for musical instruction and gaming comprising:
presenting a user with a series of three dimensional shapes each associated with a musical tone from a graphics processor via a user interface, each three dimensional shape having a series of active regions and a first surface illustrating a musical letter and a second surface illustrating a musical instrument;
receiving at a musical education processor a selection of a three dimensional shape associated with a musical tone from the user interface;
generating the musical tone associated with the musical letter and the musical instrument illustrated on the selected three dimensional shape in response to the selection and transmitting the musical tone to an audio output at the user interface; and
simultaneously generating a graphical representation associated with the selection on at least one of the active regions of the selected three dimensional shape.

15. The method of music instructions and gaming of claim 14, wherein each three dimensional shape is a three dimensional representation of a musical instrument.

16. The method of music instructions and gaming of claim 14, wherein each three dimensional shape is a three dimensional representation of an object capable of generating a musical tone.

17. The method of music instructions and gaming of claim 14, wherein each three dimensional shape is a three dimensional representation of an object not representative of an object capable of generating a musical tone.

18. The method of music instructions and gaming of claim 14 further comprising:
receiving a series of selected three dimensional shapes from the user interface indicative of a word spelled using the musical letters illustrated on the series of selected three dimensional shapes;
generating a series of musical tones associated with the spelled word;
transmitting the series of musical tones to the audio output at the user interface for playback of the musical tones to the user.

* * * * *